United States Patent [19]
Sim et al.

[11] Patent Number: 5,653,008
[45] Date of Patent: Aug. 5, 1997

[54] METHOD FOR FABRICATING THE HEATER BURIED PLANE WAVEGUIDE PATH TYPE OF AN OPTICAL SWITCH

[75] Inventors: Jae-Gi Sim, Daejeon; Jang-Uk Sin, Kyounggi-Do; Myoung-Young Chung; Tae-Goo Choi, both of Daejeon, all of Rep. of Korea

[73] Assignees: Electronics and Telecommunications Research Institute, Daejeon-shi; Korea Telecommunication Authority, Seoul, both of Rep. of Korea

[21] Appl. No.: 564,504

[22] Filed: Nov. 29, 1995

[30] Foreign Application Priority Data

Dec. 19, 1994 [KR] Rep. of Korea ............... 94-35167

[51] Int. Cl.⁶ .................................................. H01P 11/00
[52] U.S. Cl. .............................. 29/600; 385/16; 385/17
[58] Field of Search ........................ 385/16, 17, 18; 29/600

[56] References Cited

U.S. PATENT DOCUMENTS 5,002,355 3/1991 Caron .
5,247,594 9/1993 Okuno et al. .

OTHER PUBLICATIONS

Kawachi, Masao; Silica waveguides on silicon and their application to integrated-optic components;Optical and Quantum Electronics 22; pp. 391–416 (1990).

Terui et al;Guided Wave Optical Gate Matrix Switch–Hybrid Integration of Silica–based Optical Waveguide Circuits and Laser Diode Optical Gates; INTT Review, pp. 114–121 (Nov. 89).

*Primary Examiner*—Carl J. Arbes
*Attorney, Agent, or Firm*—Larson and Taylor

[57] ABSTRACT

The present invention relates to a method for fabricating the plane waveguide path type of the heater buried optical switch, and it exposes the thin film heater removing the second clad layer to speed the heat radiation of the thin film heater by forming flatly the first clad layer having the thin thickness of about 5–10 μm on the channel waveguide path on which the channel waveguide path is formed on the lower clad layer, and forming the second upper clad layer in the thickness of about 15–20 μm on the first clad layer and the thin film heater after the thin heater having the line width of about two times as compared with these of the channel waveguide path is formed at the channel waveguide path and the corresponding portion on the first upper clad layer. Therefore, the crosstalk between the neighboring channel waveguides can be protected since the heat generated in the thin film heater inhibits to transmit the neighboring channel waveguide paths, and the switch velocity accelerates as speeding the heat transmitting velocity, and it can operate at the low operational power.

16 Claims, 2 Drawing Sheets

METHOD FOR FABRICATING THE HEATER BURIED PLANE WAVEGUIDE PATH TYPE OF AN OPTICAL SWITCH

TECHNICAL FIELD OF INVENTION

The present invention relates in general to a fabrication of the plane waveguide path type of an optical switch changing the flowing phase of the optical signal by adjusting the temperature of the waveguide by the heater, and more particularly to a method for fabricating the plane waveguide path type of the heater buried optical switch which can protect the crosstalk for the neighboring optical signal due to the temperature change by minimizing to affect the channel waveguide path and improve both the switching velocity and the switching power of the optical switch.

BACKGROUND OF THE INVENTION

Recently, as a result of the development of high transmitting speed optical communications systems which ease network structure being developed, optical communication techniques are required to construct the optic fiber, the light source and the optical detector as well as a number of the function of an optical components. The optical switch and a wavelength divider etc. is to change the transmission path passing through the light in the optical divider and the optical coupler for dividing and coupling the optical signal with the optical components.

The optical switch of a number of the optical components is very important in order to freely switch to another transmission line according to the requirement thereof if any transmission line fails.

The optical switch is generally separated into the bulk type of the optical switch position and the waveguide path type of the optical switch position.

The bulk type of the optical switch has the advantage of having a small wavelength dependence and a relative low loss features by using a moving prism and lens, but it is not amenable to a production on a large scale because the assembly and the adjusting process thereof are complex and expensive.

However, the waveguide path type of the optical switch is amenable to by producing on a large scale easily since it is fabricated by using the fabrication technique of the semiconductor device.

The waveguide path type of the conventional optical switch is discussed in an article entitled "Silica waveguide on silicon and their application to integrated optic components", Optical and Quantum Electronics, Volume 22 (1990), pages 391–416.

The optical switch is sequentially deposited on a lower clad layer and the silica layer of the silicon oxide layer on the silicon substrate by the flame hydrolysis deposition method, and the silica layer is patterned by the Reactive Ion Etching(RIE) method, and forms the channel waveguide path.

An upper clad layer covering the channel waveguide path is deposited on the lower clad layer, in which the upper clad layer is formed to the thickness of 30 μm or more so that the surface thereof can be planed.

Then, a heater switching mechanism to change the phase of the optical signal transmitted by adjusting the temperature of the channel waveguide path is formed on the channel waveguide path and the corresponding upper clad layer.

However, the waveguide path type of the optical switch as mentioned hereinabove has a problem in which the heat diffuses when any of the channel waveguide paths apply the heat. The diffused heat changes the phase of the optical signal transmitted by heating those together with the neighboring channel waveguide path because the upper clad layer has been formed too thickly, thereby generating the crosstalk.

The heat generated by the thick upper clad layer at the thin film heater is the problem because it slows too much the switch velocity since the velocity to be delivered to the channel waveguide path slows. Also the operational power is large to deliver to the channel waveguide path under the condition in which the heater generating at the thin film heater must be high.

SUMMARY OF THE INVENTION

Therefore, an object of the present invention is to provide a method for fabricating the plane waveguide path type of the heater buried optical switch which can protect the crosstalk by not heating the neighboring channel waveguide path when the heat applies to any of the channel waveguide paths.

Another object of the present invention is to provide a method for fabricating a plane waveguide path type of the heater buried optical switch which can operate at the requisite speed switch velocity and have a low operational power.

A method for fabricating the plane waveguide type of the heater buried optical switch according to the present invention for the purpose as mentioned hereinabove comprises the step of forming the lower clad layer and the channel waveguide path layer on a silicon substrate, and sequentially the step of forming the mask on said channel waveguide path layer, the step of forming the channel waveguide path by etching said channel waveguide path layer using said mask and removing said mask, the step of forming the first upper clad layer on said lower clad layer and said channel waveguide path, the step of forming the thin film heater at the portion corresponding to said channel waveguide path on said first upper clad layer, and the step of forming the second clad layer on said first upper clad layer and said thin film heater.

DESCRIPTION OF THE DRAWINGS

Further features and advantages will become more apparent from the following, more detailed description of the preferred embodiment of the invention, as illustrated in the accompanying drawings, and in which.

DETAILED DESCRIPTION OF THE INVENTION

Figure 1:
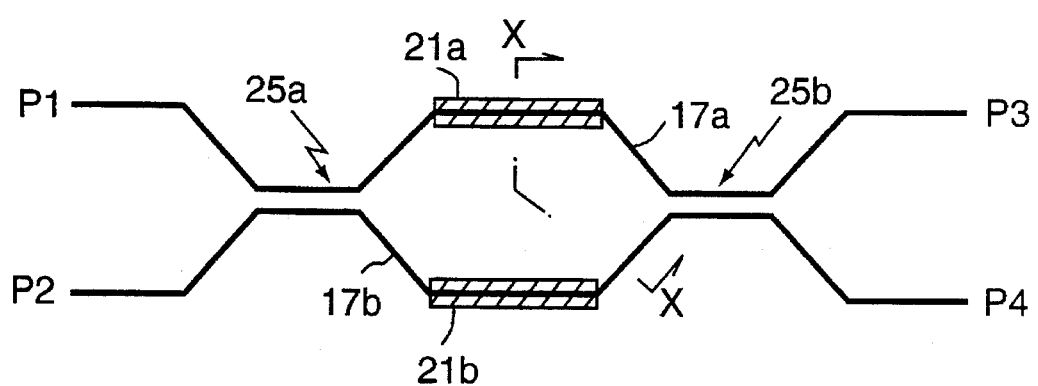
FIG. 1 is a top plan view of a plane waveguide path type of the heater buried optical switch according to the present invention.

FIG. 1 is the top plan view of the plane waveguide path type of the heater buried optical switch according to the present invention.

The optical switch has two relatively closely located channel waveguide paths 17a and 17b formed between two couplers 25a and 25b. The coupling rate of the couplers 25a and 25b is estimated at the 50 percentage of the optical signal wavelength. The channel waveguide paths 17a and 17b between two couplers 25a and 25b have the same length, respectively, and the thin film heaters 21a and 21b are located thereon.

The thin film heaters 21a and 21b shut off the path by changing the phase of the optical signal which is transmitted by being alternatively heated with a power supply (not shown), and transferring the heat to the channel waveguide paths 17a and 17b.

That is, the optical signal passing through the port 1 P1 is coupled by the coupler 25a, and transferred to the port 4 P4 through the channel waveguide path 17b since the channel waveguide path 17a is shunted off when the thin film heater 21a is heated.

It is also referred to the cross state for transferring the optical signal from the port 2 P2 to the port 3 P3, from the port 1 P1 to the port 4 P4 in the bar state, and from the port 2 P2 to the port 4 P4.

FIGS. 2(A) to (D) illustrate the process of the plane waveguide path type of the heater buried optical switch using a cross-section taken along line X—X in FIG. 1.

Figure 2:
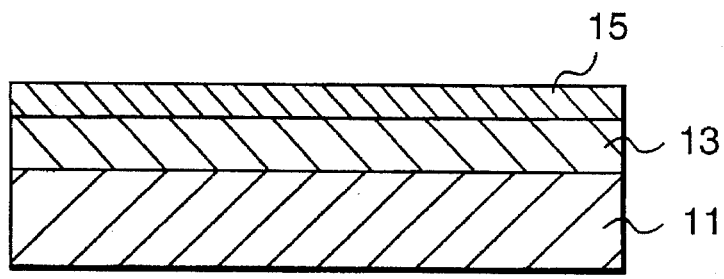
FIGS. 2(A) to (D) are cross-sectional views taken along line x—x in FIG. 1, and illustrate the process of the plane waveguide path type of the heater buried optical switch according to the present invention.
Figure 2:
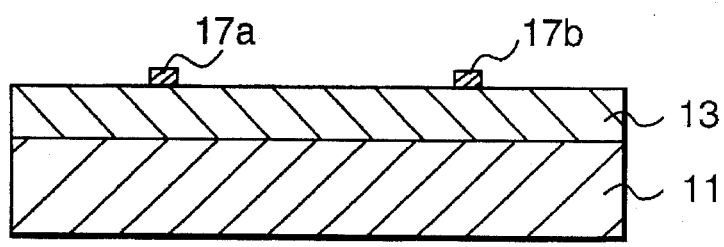
Figure 2:
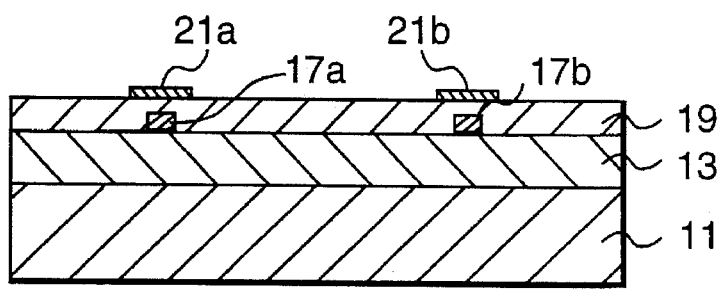
Figure 2:
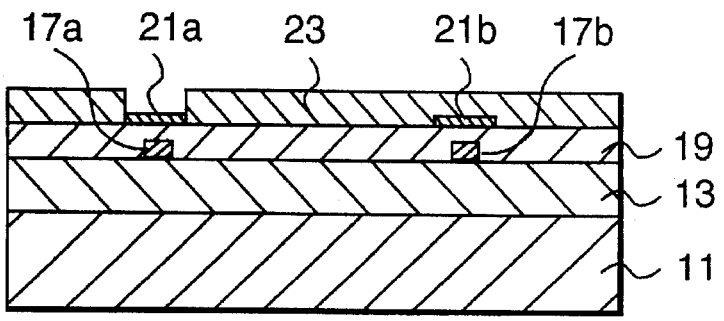

Referring to FIG. 2(A), a lower clad layer 13 and a waveguide path layer 15 are sequentially formed on the silicon substrate 11.

The lower clad layer 13 is formed by depositing PSG (the Phosphosilicate Glass) in the thickness of about 18– 22 μm and the waveguide path layer 15 is formed by depositing GPSG(the Germano-Phosphosilicate Glass) in the thickness of about 6–8 μm by the flame hydrolysis deposition method.

Then, after the formed lower clad layer 13 and the waveguide path layer 15 are heated for five through fifteen minute in the $BCl_2$ O SCCM atmosphere temperature on the order of 1000–1100 degrees centigrade, then it is high-concentrated by heating for five through ten hours in the He 300 SCCM 4 $O_2$ 200 SCCM atmosphere.

Then, it is high-concentrated by flowing the He and the steam at the resultant step as discussed above at the same time.

The heat treatment in the $RCl_2$ atmosphere renders to be low the impurity and the melting point by removing the OH group being included in the lower clad layer 13 and the waveguide path layer 15, and the heat treatment in the He or $O_2$ atmosphere is minimized to form the bubble in the lower clad layer 13 and the waveguide path layer 15.

Then, the refractive index of the waveguide path layer 15 renders 0.1–3 percentage by changing the weight of $GeCl_4$ per a time considering the waveguide path loss and the bending loss.

Referring to FIG. 2(B), an amorphous silicon, the aluminium or the chrome et al., form the mask layer by depositing in the thickness on the order of 0.25–0.5 μm on the waveguide path layer 15.

Then, the photoresist film pattern(not shown) is formed at any of portions on the mask layer, and the mask and the channel waveguide paths 17a and 17b are formed by sequentially anisotropic etching the mask layer and the waveguide path using the photoresist film pattern as a mask.

As mentioned hereinabove, the mask is formed by the reactive ion etching the photoresist pattern using the $Cl_2$ gas, and then the photoresist pattern is removed by the $O_2$ plasma.

The channel waveguide paths 17a and 17b are etched by the Inductive Coupled Plasma method with the mixed gas having the 4–8:1 composition ratio of the $CF_4$ and the $CHF_3$, and has the line width of about 6–8 μm in the symmetric structure according to the waveguide path.

Then, GPSG constructing the waveguide paths 17a and 17b is in which the etching selection ratio of the aluminum containing therein is 40–60:1, and the etching velocity is 0.3–0.7 μm/minute.

Then, the mask is removed by a wet etching.

Referring to FIG. 2(C), BPSG(the Boro-Phosphosilicate Glass) is deposited by the flame hydrolysis deposition method to cover the channel waveguide paths 17a and 17b on the lower clad layer 13, high concentrated by the heat treatment, and thus forms the first upper clad layer 19.

Then, the first upper clad layer 19 is formed in the thickness on the order of 10–18 μm on the channel waveguide paths 17a and 17b.

Then, the titanium or the tantalum et al., is deposited in the thickness of about 0.1–0.2 μm by any of methods including the electronic beam or sputtering method on the first upper clad layer 19, and the thin film heaters 21a and 21b is defined by the common photolithograp method on the channel waveguide paths 17a and 17b.

The line width of about 12–16 μm of the thin film heaters 21a and 21b is nearly two time defined these of the channel waveguide paths 17a and 17b.

Referring to FIG. 2(D), BPSG(the Boro-Phosphosilicate Glass) is deposited in the thickness on the order of 15–20 μm by the flame hydrolysis deposition method on the first upper clad layer 19 and the thin film heaters 21a and 21b in the same method as the first clad layer 19, high concentrated by the heat treatment, and then forms the first upper Clad layer 19.

Then, the thin film heaters 21a and 21b, and the first upper clad layer 19 are low in temperature by the about 1000–1050 degrees centigrade to protect the modification thereof, and flow in about 10–15 SCCM the $BCl_3$ of about 750–850 degrees centigrade.

The thin film heaters 21a and 21b expose removing the second clad layer 23 to speed the heat radiation in again restoring thereof after the channel waveguide paths 17a and 17b are Shunted off by the thin film heaters 21a and 21b applying to the heat.

The present invention as mentioned hereinabove exposes the thin film heater removing the second clad layer to speed the heat radiation of the thin film heater by forming flatly the first clad layer having the thin thickness of about 5–10 μm on the channel waveguide path on which the channel waveguide path is formed on the lower clad layer, and forming the second upper clad layer in the thickness of about 15–20 μm on the first clad layer and the thin film heater after the thin heater having the line width of about two times as compared with these of the channel waveguide path is formed at the channel waveguide path and the corresponding portion on the first upper clad layer.

Therefore, it is advantage that the crosstalk between the neighboring channel waveguides can be protected since the heat generated in the thin film heater inhibits to transmit the neighboring channel waveguide paths, and the switch velocity accelerates as speeding the heat transmitting velocity, and thus can operate at the low operational power.

What is claimed is:

1. A method for fabricating the plane waveguide path type of the heater buried optical switch, comprising the steps of:
   sequentially forming a lower clad layer and a channel waveguide path layer on a silicon substrate;
   forming a mask on said channel waveguide path layer;
   forming a channel waveguide path by etching said waveguide path layer using said mask and then removing said mask;

forming a first upper clad layer on said lower clad layer and said channel waveguide path;

forming a thin film heater at a location corresponding to said channel waveguide path on said first upper clad layer, and forming a second upper clad layer on said first upper clad layer and said thin film heater.

2. The method of claim 1, wherein said lower clad layer is formed from PSG(Phosphosilicate Glass).

3. The method of claim 2, wherein said lower clad layer is formed in the thickness of 18–22 μm.

4. The method of claim 1, wherein said channel waveguide path layer is formed from GPSG(Germano-Phosphosilicate Glass).

5. The method of claim 4, wherein said channel waveguide path layer is formed in the thickness of 6–8 μm.

6. The method of claim 1, wherein said lower clad and channel waveguide path layers are highly concentrated by a heat treatment.

7. The method of claim 6, wherein said lower clad and waveguide path layers are firstly heat-treated for five to fifteen minute in a $BCl_2$ atmosphere at a temperature of 750–850 degrees Centigrade, and secondly heat-treated for five to ten hours in a $He+O_2$ atmosphere at a temperature of 1000–1050 degrees Centigrade.

8. The method of claim 1, wherein said channel waveguide path is etched with a mixed gas having a composition ratio of 4–8:1 of $CF_4$ and $CHF_3$.

9. The method of claim 8, wherein said channel waveguide path is formed having a line width of 6–8 μm.

10. The method of claim 1, wherein said first upper clad layer is formed from BPSG(Boro-Phosphosilicate Glass).

11. The method of claim 10, wherein said first upper clad layer is formed in the thickness of 10–18 μm including in the thickness of 5–10 μm on said channel waveguide path.

12. The method of claim 1, wherein said thin film heater is formed of the titanium and tantalum.

13. The method of claim 12, wherein said thin film heater is formed in a thickness of 0.1–0.2 μm and the line width of 12–16 μm.

14. The method of claim 1, wherein said second upper clad layer is formed from BPSG(Boro-Phosphosilicate Glass).

15. The method of claim 14, wherein said second upper clad layer is formed in the thickness of 15–20 μm on said channel waveguide path.

16. The method of claim 1, further comprising the step of removing that portion of said second upper clad layer on said thin film heater.

* * * * *